Nov. 13, 1945. W. E. HUMPHREY Re. 22,691
SHUTTLECOCK MACHINE
Original Filed Jan. 8, 1942 8 Sheets-Sheet 1
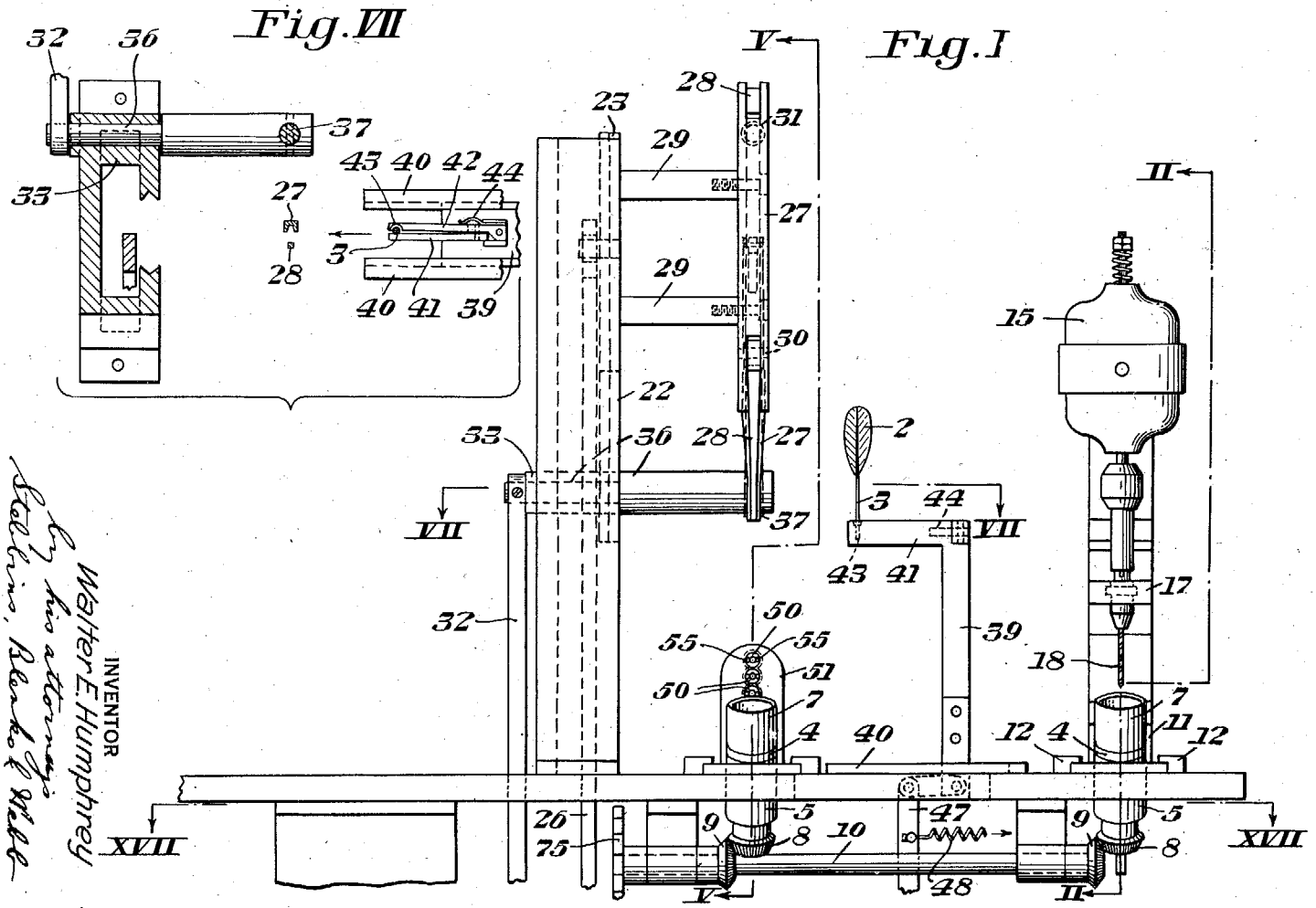
INVENTOR
Walter E. Humphrey
by his attorneys
Stebbins, Blenko & Webb Nov. 13, 1945. W. E. HUMPHREY Re. 22,691
SHUTTLECOCK MACHINE
Original Filed Jan. 8, 1942 8 Sheets-Sheet 2
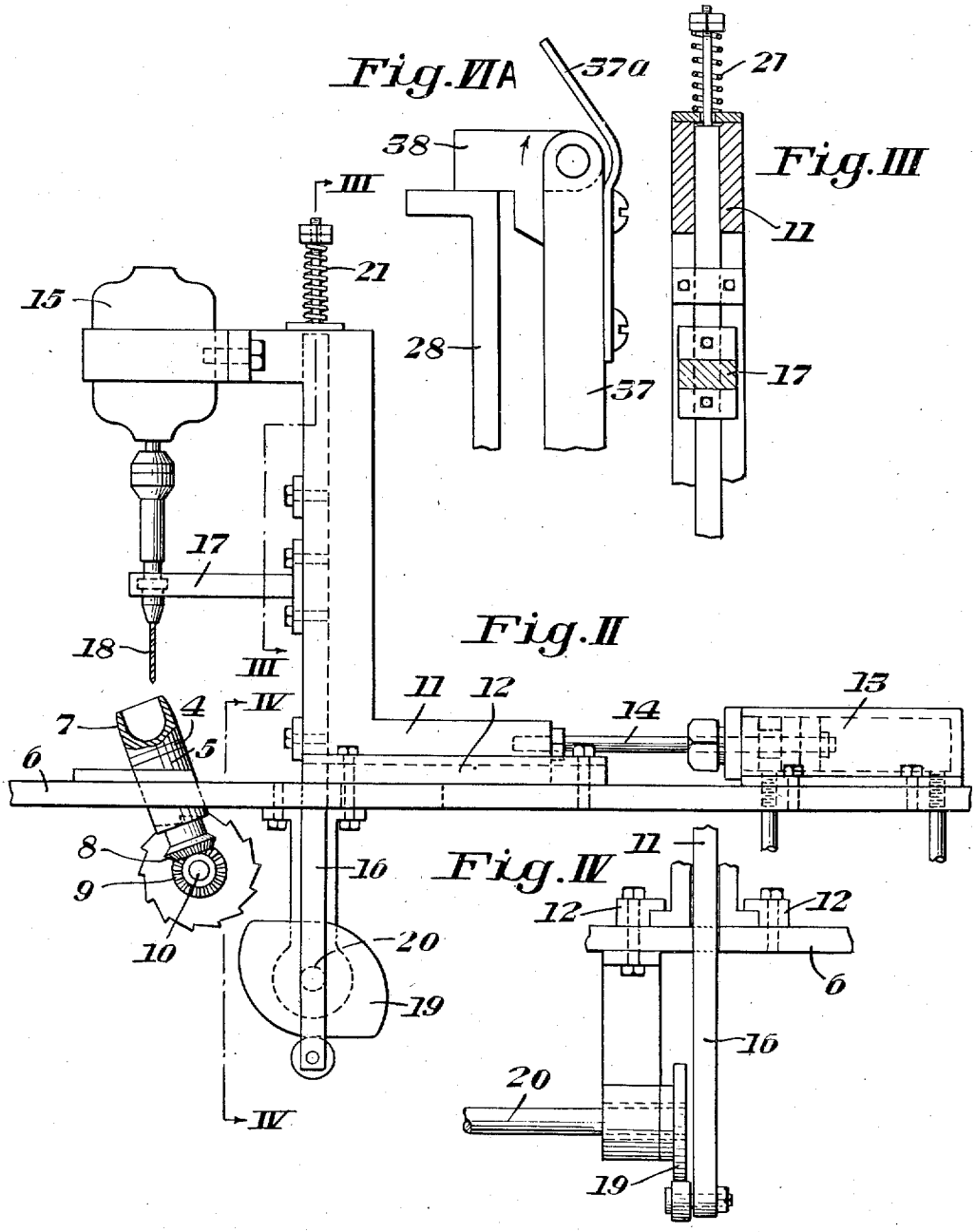
INVENTOR
Walter E. Humphrey
by his attorneys
Stebbins, Blenko & Webb Nov. 13, 1945. W. E. HUMPHREY Re. 22,691
SHUTTLECOCK MACHINE
Original Filed Jan. 8, 1942 8 Sheets-Sheet 3
Fig. V
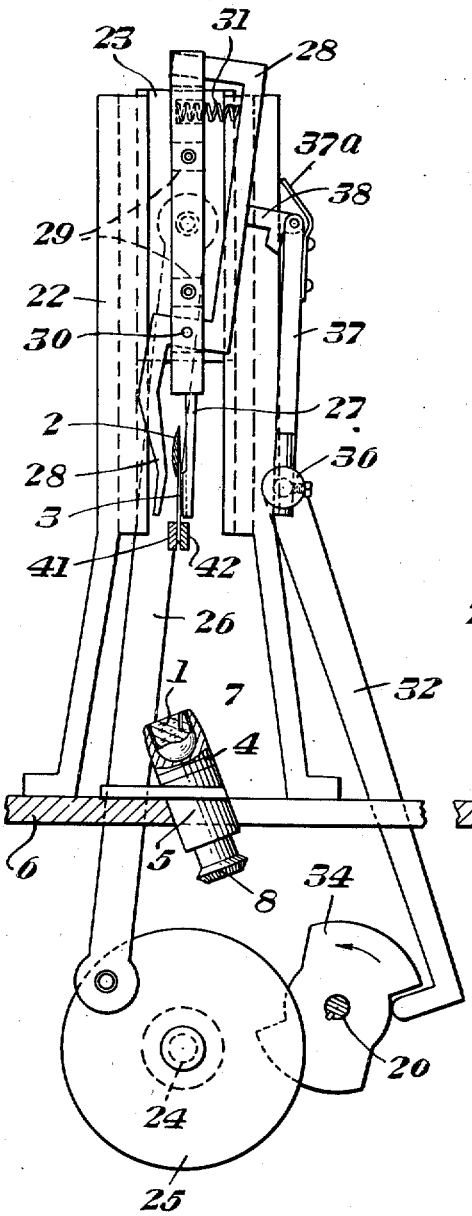
Fig. VI
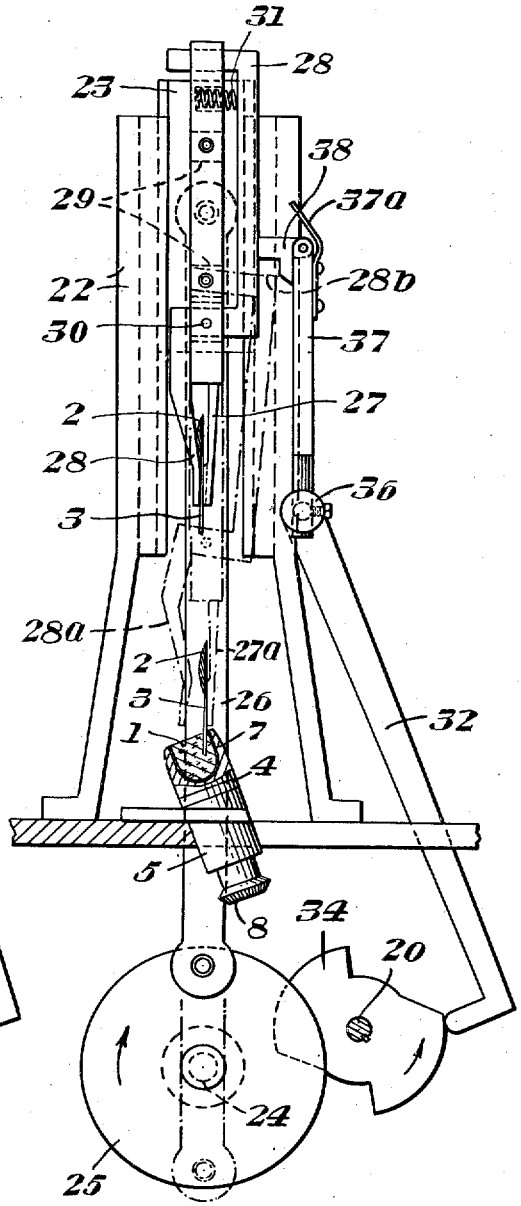
INVENTOR
Walter E. Humphrey
by his attorneys
Stebbins, Blenko & Webb Nov. 13, 1945. W. E. HUMPHREY Re. 22,691
SHUTTLECOCK MACHINE
Original Filed Jan. 8, 1942 8 Sheets-Sheet 4
Fig. VIII.
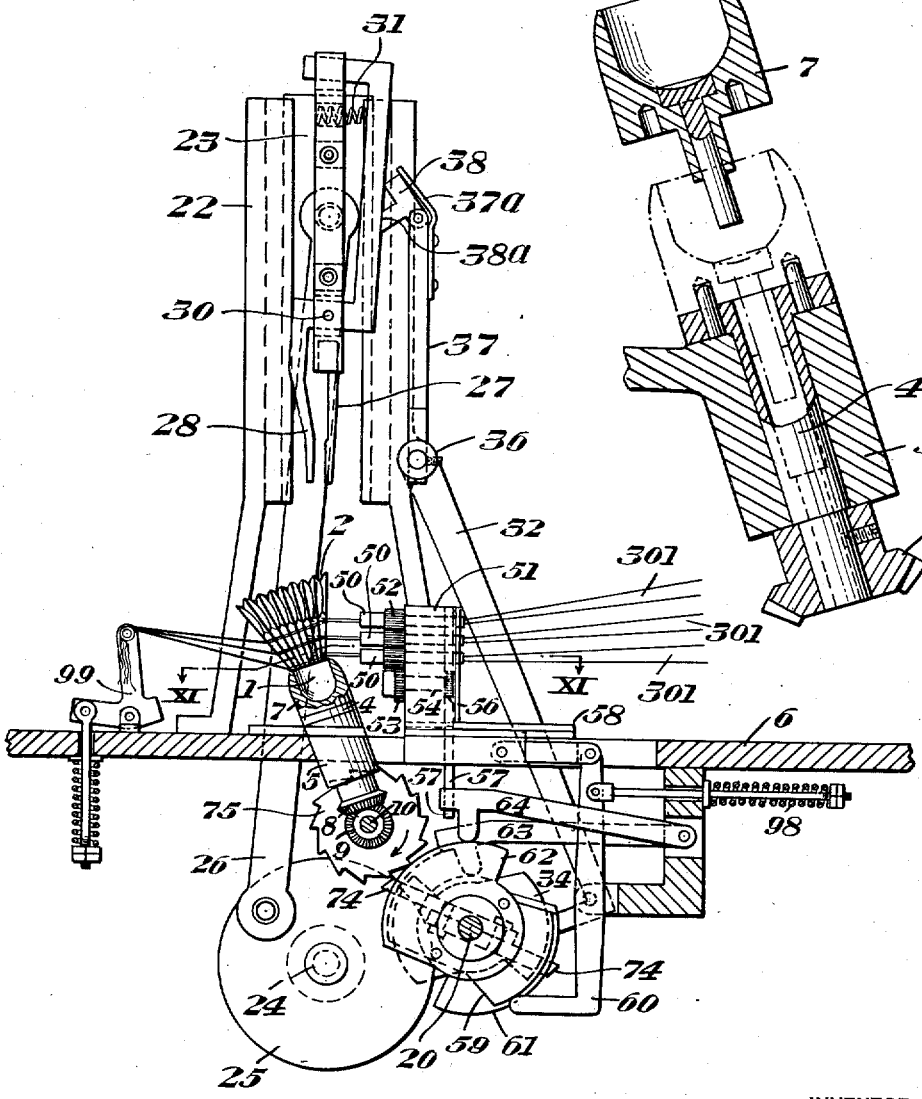
Fig. X.
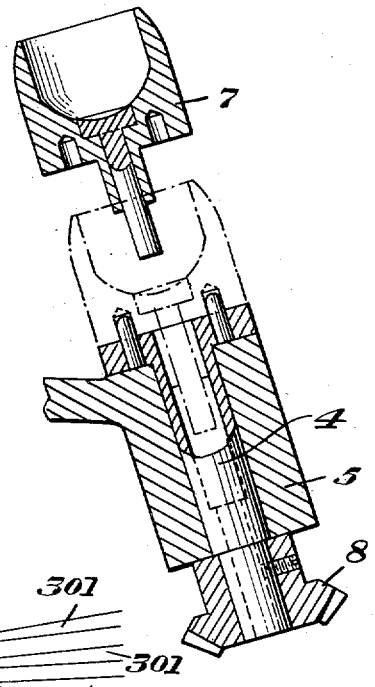
INVENTOR
Walter E. Humphrey
by his attorneys
Stebbins, Blenko & Webb Nov. 13, 1945. W. E. HUMPHREY Re. 22,691
SHUTTLECOCK MACHINE
Original Filed Jan. 8, 1942 8 Sheets-Sheet 5
Fig. XI
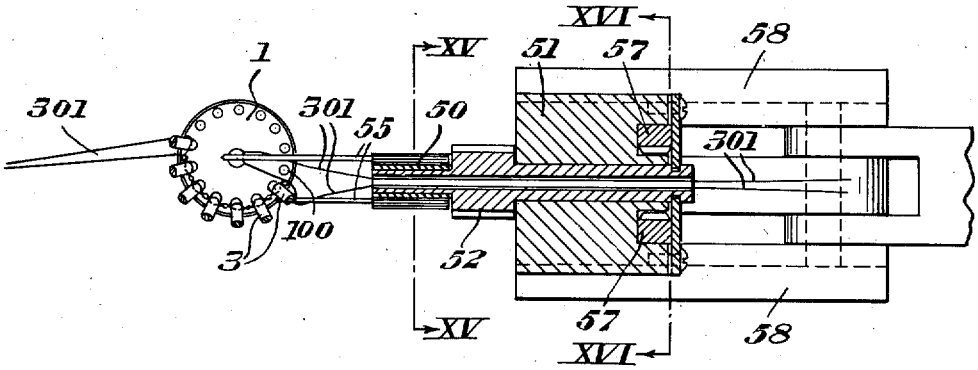
Fig. XII
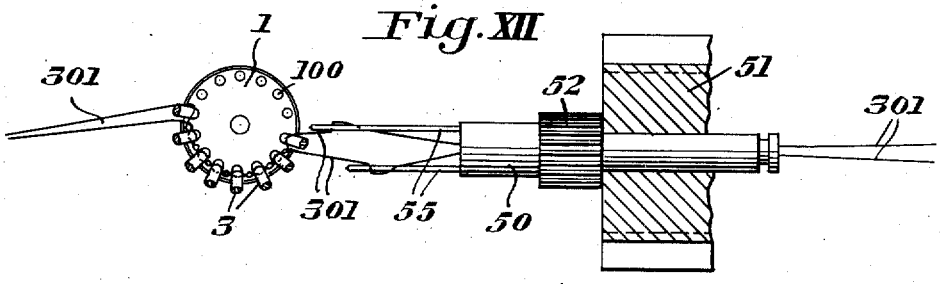
Fig. XIII
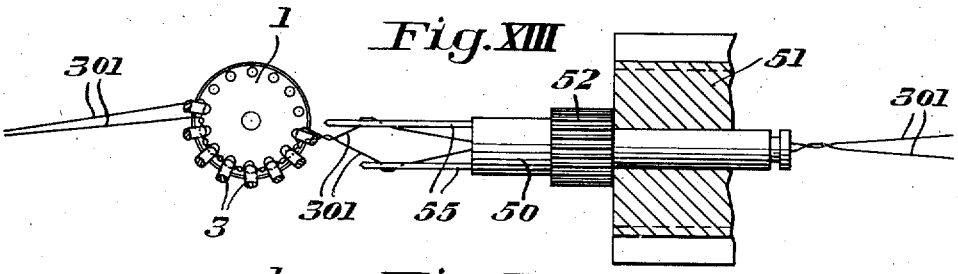
Fig. XIV
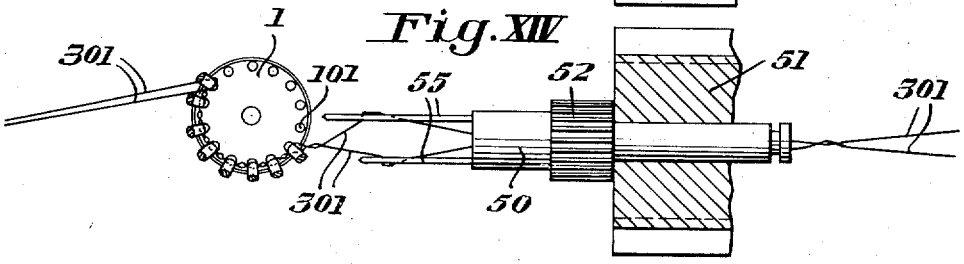
INVENTOR
Walter E. Humphrey
by his attorneys
Stebbins, Blenko & Webb Nov. 13, 1945. W. E. HUMPHREY Re. 22,691
SHUTTLECOCK MACHINE
Original Filed Jan. 8, 1942 8 Sheets-Sheet 6
Fig. XV
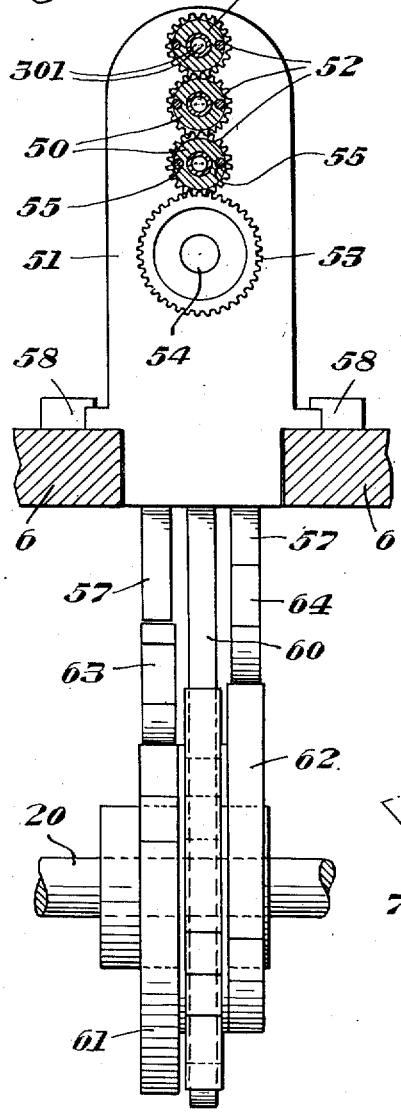
Fig. XVI
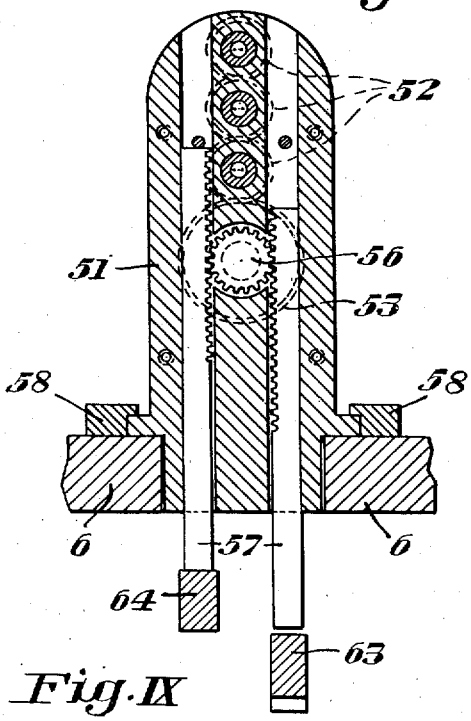
Fig. IX
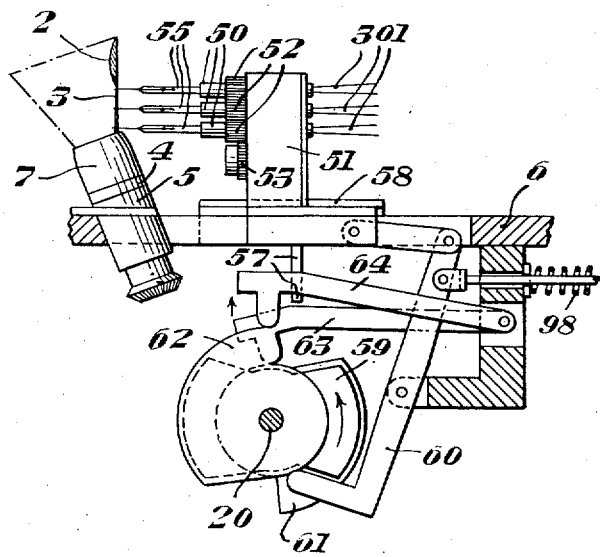
INVENTOR
Walter E. Humphrey
by his attorney:
Stebbins, Blenko & Webb Nov. 13, 1945. W. E. HUMPHREY Re. 22,691
SHUTTLECOCK MACHINE
Original Filed Jan. 8, 1942 8 Sheets-Sheet 7
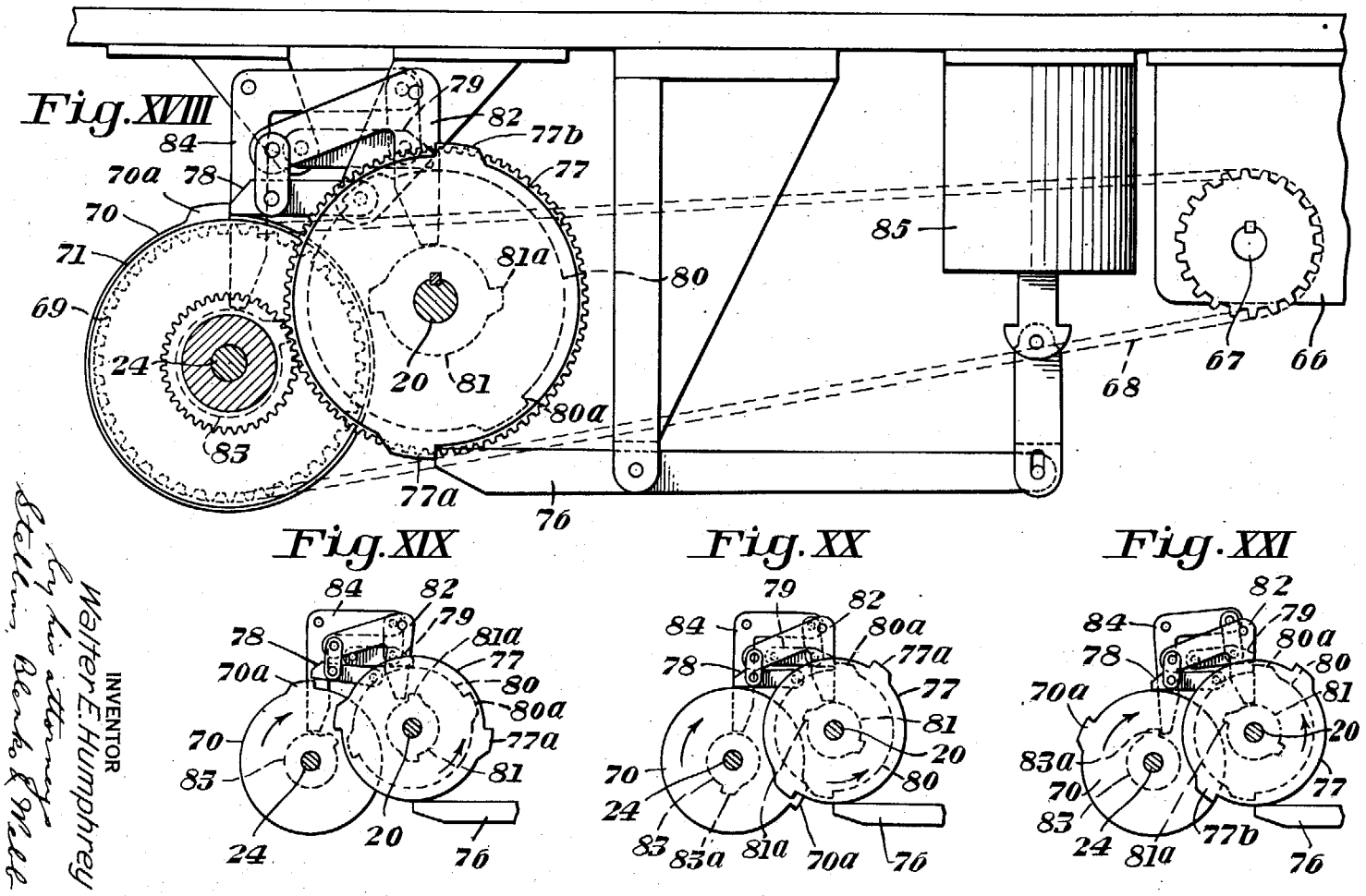
Fig. XVIII
Fig. XXI
Fig. XX
Fig. XIX
INVENTOR
Walter E. Humphrey
by his attorneys
Stellins, Blenko & Webb Nov. 13, 1945. W. E. HUMPHREY Re. 22,691
SHUTTLECOCK MACHINE
Original Filed Jan. 8, 1942 8 Sheets-Sheet 8
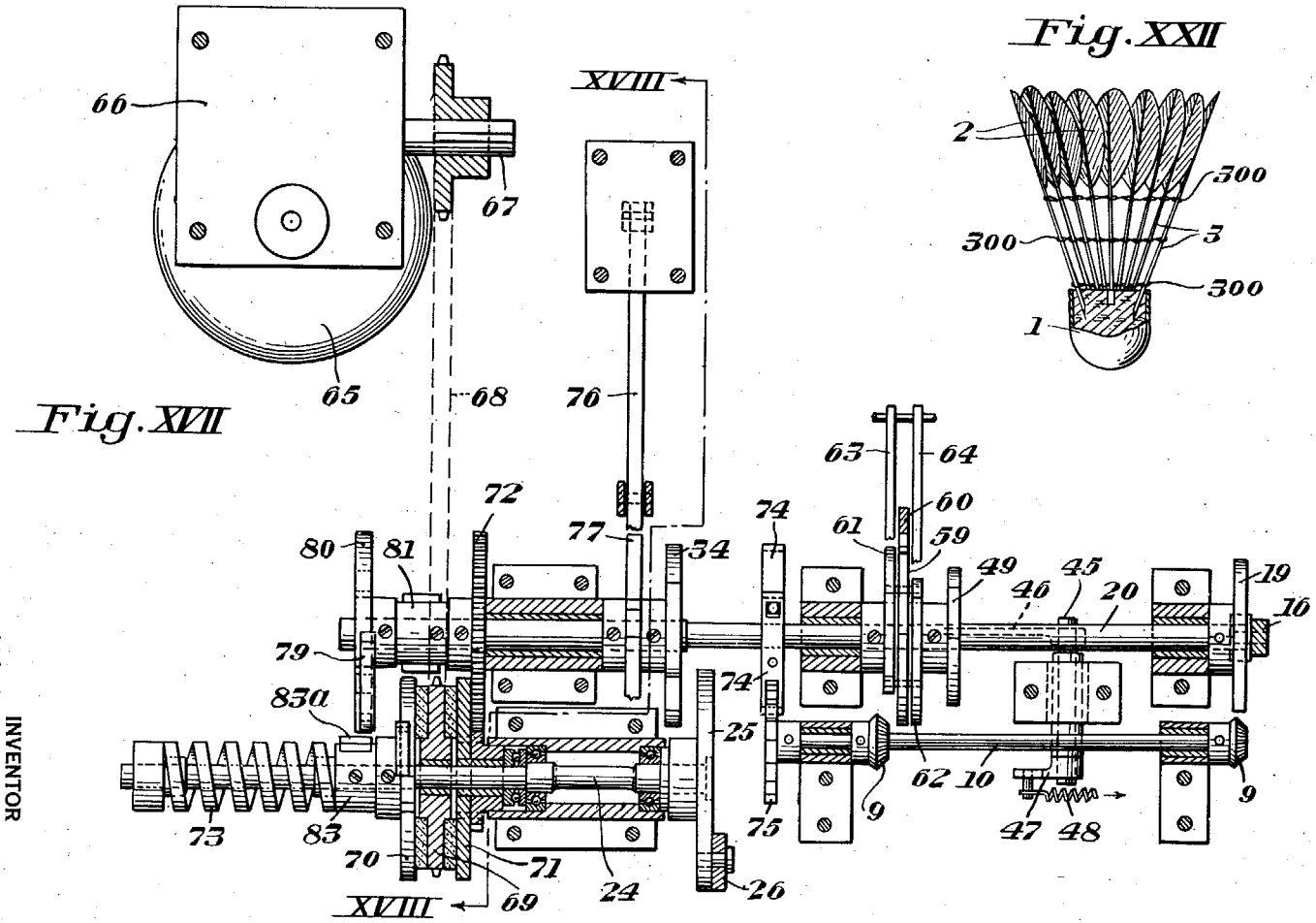
INVENTOR
Walter E. Humphrey
by his attorneys
Stebbins, Blenko & Webb Reissued Nov. 13, 1945 Re. 22,691

UNITED STATES PATENT OFFICE 22,691

SHUTTLECOCK MACHINE

Walter E. Humphrey, Jeannette, Pa., assignor to Pennsylvania Rubber Company, Jeannette, Pa., a corporation of Pennsylvania Original No. 2,331,981, dated October 19, 1943, Serial No. 426,022, January 8, 1942. Application for reissue October 12, 1944, Serial No. 558,447

33 Claims. (Cl. 144—2)

This invention relates to the manufacture of badminton shuttlecocks, commonly called birds. Such a shuttlecock or bird consists of a head and a vane. The head is of approximately cylindrical form, rounded at one end to substantially spherical curvature; it is approximately an inch long and an inch and a quarter in diameter; it is commonly formed of cork encased in leather (kid). The vane commonly consists of feathers set in conical assembly, symmetrical with respect to the axis of the cylindrical head, set in a circular succession of holes sunk obliquely in the rear face of the head and near the periphery of that circular rear face. When the feathers have been set they are re-enforced and secured in assembled position by rows of stitching; and, finally, the rear face of the head and the stitched-together shanks of the planted feathers are coated with an integrating lacquer. In Letters Patent No. 2,262,045, granted November 11, 1941, on the application of D. H. Pollitt, now held in common ownership with the invention of this application, a process is described of applying to the assembled shuttlecock the lacquer coating. In that patent the planted feathers that constitute the vane are shown to be stitched together, in that case with two rows of stitching. The present invention consists in machinery for sinking holes in the head, and planting and stitching together the feathers that make up the vane. The objects of the invention are accuracy, speed, and economy.

In respect to the stitching together of the feathers, the invention consists in the provision, in combination with the feather-planting mechanism, of means for successively twisting circumferential threads about the shafts of the several feathers as they are planted. This operation is known in the trade as "sewing" and may comprise the application of from one to three bands of thread spaced along the feather shafts. At least two threads are contained in a single band and these threads are twisted between adjacent feather shafts so that each shaft is enclosed and firmly held by a loop formed by the twisted threads. So far as I am aware, the operation of sewing a shuttlecock using ordinary lockstitching has always been performed by hand or machine as a separate operation from the insertion of the feathers. The machine of the present invention is the first which has been perfected for planting the feathers and "sewing" them as a single operation. The machine is shown with provision for simultaneously sewing three bands of threads, but in the manufacture of cheaper shuttlecocks one or two bands will suffice.

In the accompanying drawings Fig. I is a general and somewhat diagrammatic view in side elevation of the machine of the invention. Fig. II is a view in end elevation and in vertical section, on the plane indicated at II—II, Fig. I. Figs. III and IV are fragmentary views in vertical section, on the planes III—III and IV—IV of Fig. II. Figs. V and VI are fragmentary views in vertical section, approximately on the plane V—V, Fig. I (minor departure, in Fig. V, from that plane will become clear in the course of description). The two figures, V and VI, show certain moving parts in successive positions of operation. Fig. VIa is a fragmentary view, showing in side elevation certain cooperating parts in organized position at a particular instant in the course of operation. Fig. VII is a view in horizontal section, on the plane VII—VII, Fig. I. Fig. VIII is a view in vertical section, also on the plane V—V, Fig. I, showing additional machine parts, omitted from Figs. V and VI. Fig. IX is a fragmentary view, corresponding to Fig. VIII, but showing certain moving parts in alternate positions of operation. Fig. X is a view to larger scale, showing in axial section a machine part which in Figs. VIII and IX appears in elevation. Figs. XI, XII, XIII, and XIV, are fragmentary views to larger scale, and in horizontal section, on the plane indicated at XI—XI, Fig. VIII, showing certain movable parts in successive positions of operation. Figs. XV and XVI are views in vertical section, on the planes XV—XV and XVI—XVI, Fig. XI. Fig. XVII is a view in horizontal section, beneath the bed-plate of the machine, and approximately on the plane XVII—VXII, Fig. I. Fig. XVIII is a view in vertical section, on the plane XVIII—XVIII, Fig. XVII. Figs. XIX, XX, and XXI are fragmentary views in vertical section on approximately the same plane with Fig. XVIII, but to smaller scale, illustrating successive positions of certain of the parts shown in Fig. VIII. Fig. XXII is a view partly in elevation and partly in axial section of the shuttlecock or bird, the assembly of whose parts is effected in the operation of the machine of this invention.

Referring, first, to Fig. XXII, the shuttlecock or bird consists of a head 1 and of a vane composed of feathers. The feathers in conventional manufacture are goose feathers, carefully selected and trimmed to substantial identity. Each feather consists of a shaft 3, bare below and pointed at its lower end, and bearing in its upper portion a web (to which the numeral 2 is immediately applied) that extends symmetrically from its opposite sides. The head 1 of cork, encased in kid is penetrated through its rear face with holes in which the feathers are set; and it will be observed that the holes are sunk obliquely to the axis of the cylindrical head, so that the assembled feathers, conforming approximately to a conical surface, form an outwardly and rearwardly flaring vane for the shuttlecock.

Referring to Fig. X, a spindle 4 is shown to be rotatably mounted in a bearing-block 5 that is rigidly mounted upon (cf. Fig. II) the bed-plate 6 of the machine. The bed-plate extends horizontally, and the bearing-block carries the spindle in obliquely inclined position. The angle at which the spindle is inclined to the vertical is the angle at which the feathers of the vane diverge from the vertical, as seen in Fig. XXII. The spindle 4 carries removably a chuck 7, recessed to receive with snug fit the head 1 of a shuttlecock, and when the chuck is in place in the spindle the chuck-carried shuttlecock head will be in position coaxial with the spindle. The pin-and-socket union shown in Fix. X between chuck and spindle insures precision of position of the chuck upon the spindle, and rotation of the assembled parts as a unit.

Fig. I shows the bed-plate 6 of the machine to carry, spaced apart at a suitable interval, two bearing-blocks 5, in each of which is rotatably mounted a spindle 4; and, as here shown, each spindle has mounted in place upon it a chuck 7. While one chuck will suffice for the performance of the invention, a plurality of them will, as a matter of convenience and expedition, ordinarily be provided. The chuck with a shuttlecock head in place within it becomes a unit, applicable to and removable from the two spindles 4 successively. The two spindles are equipped each with a member 8 of a bevel-gear drive, and companion and complementary members 9 are borne by a shaft 10. It is manifest that by the pin-and-socket connection between chuck and spindle, a chuck 7 removed from one spindle may be applied to the other with precision of placement in the matter of angular position with respect to the axis of turning; and that, by duplication in dimension of the two bevel-gear drives, the turning of shaft 10 will effect simultaneous turning of the two spindles through equal ranges.

A block 11 guided between ways 12 is reciprocable upon the bed-plate 6; and means for effecting reciprocation through a predetermined range, and in co-ordination with the movements of other parts of the machine, are in Fig. II shown in the form of a fluid pressure cylinder 13, with the stem 14 of whose piston the block 11 is rigidly connected. On the block 11 a motor 15 is mounted, and the parts are so positioned that, in the reciprocation of block 11, the motor is brought to position directly above the spindle 5 on the right (Fig. I) and withdrawn from such position. In the block 11 a vertically extending slideway is formed, and in this slideway a slide 16 is reciprocable (Fig. III). From slide 16 extends an arm 17 that carries rotatably a drill 18. The drill is aligned with the driven shaft of motor 15 and is connected with the motor shaft by an extensible connection. The movement of the slide 16 in its slideway is controlled by a cam 19 borne by a shaft 20 that engages the lower end of the slide, and the cam 19 shifts the slide downward against the resistance of a spring 21. The rotation of the cam 19 is co-ordinated with the operation of other machine parts, as hereinafter will appear.

The parts are so organized that, when a shuttlecock head has been set in a chuck 7 and the chuck mounted on the spindle 4 to the right (Fig. I), the advance of the block 11 from right to left (Fig. II) will bring the drill 18 precisely to position for drilling in the seated head a hole for a feather. When this advance has been effected the turning of cam 19 effects the descent of the drill 18 (which, it will be understood, driven by motor 15, is in rotation) and the drilling of the desired hole in the shuttlecock head. Furthermore, block 11 continuing in the advanced position shown in Fig. II, and the turning of shaft 10 being rendered intermittent and the range of turning being controlled, and cam operation being brought into co-ordination with spindle turning, it is manifest that as machine operation continues a succession of holes properly spaced and in circumferential succession may be drilled in the seated shuttlecock head. When this has been done, co-ordinated operation of cylinder 13 will effect the retraction of block 11. The chuck that carries the shuttlecock head, now drilled with the holes for the feathers, may then be raised manually from the spindle 4 to the right (Fig. I) and mounted on the spindle to the left. And it will be particularly remarked that, in consequence of the pin-and-socket union of chuck to spindle, the previously drilled holes in the head do not come to place at haphazard, but in definite space relationship to other machine parts, and, more particularly, to those machine parts next to be described.

Adjacent the spindle 4 to the left (Fig. I) the table 6 carries a slideway 22 in which a slide 23 is vertically reciprocable (cf. Figs. V, VI, VII and VIII). Reciprocation of slide 23 is effected by the rotation of a shaft 24 made effective through a crank-disk 25 and a link 26. The slide 23 carries a clamp which as the slide reciprocates closes and opens, to grasp a feather, to plant it in a previously drilled hole in the head, and to release the planted feather that the cycle of operation may progress.

The clamp consists of two members, one of which, the member 27, is rigidly carried upon posts 29 by the slide 23, and the other, the member 28, is pivotally borne by member 27 on the pin 30. The pivoted member 28 of the clamp is extended, so that it becomes a lever of the first kind; and the rigidly borne member 27 and the pivoted member 28 together cooperate, closing and opening with the movement of a pair of scissors. A spring 31 tends constantly to open the clamp. Closing (against the tension of spring 31) is effected by a lever 32 which is intermittently swung counterclockwise (Figs. V, VI, and VIII) in its pivot bearing 33 by the advance of a cam 34 borne by the turning shaft 20. The more detailed structure of the lever 32 will be understood on comparing Figs. I, VII and VIII. A spindle 36 is rotatable in the bearing 33; with this spindle, at one end, the lever arm that bears the numeral 32 is integrally united; and with it at the other end the work-arm 37 of the clamp-controlling lever is integrally united; (though with provision for adjustment, as the drawings show).

The operation of the several moving parts of the machine is a step-by-step operation, and, as will presently appear, the intermittent movement of each part is co-ordinated with the movements of the other parts. Referring to Fig. VIII, it will be understood that the crank-disk 25 is at the moment at rest, with the slide-borne clamp 27, 28 in position to be opened for the reception of a feather. While the clamp is at rest in such position, the turning shaft 20 carries the cam 34 from the position in which it is shown in Fig. VIII into the position shown in Fig. V, and in consequence the lever 32 swings clockwise (under gravity), and the clamp, released to the effect of spring 31, opens. Rotation of the cam 34 continuing from the position shown in Fig. V to that shown in Fig. VI, the lever is swung counter-clockwise, closing the clamp again. As the clamp closes, the crank-disk 25 is set in clockwise rotation, raising the slide 23 to its upper limit (cf. the full-line position in Fig. VI), and effecting its descent (that is to say, through the position shown in Fig. V) to the position shown in broken lines 27*a*, 28*a* in Fig. VI. As, however, the slide-borne clamp approaches its lower limit (the broken-line position of Fig. VI), the lever arm of the clamping member 28, descending, passes beyond the restraint of block 38 carried by arm 37 rigid with lever 32, whereupon the spring 31 becomes effective to open the clamp, while the lever 32 (from which the clamp has escaped) continues in clamp-closing position.

The engagement of the lever 32, 37 with the clamping member 28 is not immediate, but is effected through a T-shaped block 38 that is pivoted by one extremity of its cross-arm to the lever arm 37, and that bears by the opposite extremity of its cross-arm (Fig. V) upon the lever-arm extension of clamping member 28. The stem of the T-shaped block, by abutment upon the lever arm 37, limits the counter-clockwise turning of the block under gravity. A stop 37*a*, borne by and extending from lever arm 37, limits the clockwise turning of block 38 and prevents it from swinging too far under the momentum of operation. When, in the descent of slide 23, the lever-arm extension of clamping member 28 has passed below the abutment of block 38 upon it, the spring 31 is effective to open the clamp, as shown in dotted lines in Fig. VI. When in continued operation the clamping member rises again, the parts being in the position shown in Fig. VI*a*, the upper end 28*b* of the lever arm of clamping member 28 bears from beneath upon the cross-arm of the T-shaped block and turns the block clockwise, bringing the inclined face 38*a* of the stem of the block 38 against the face of the lever-arm extension of the clamping member 28, thus leaving the clamping members 27, 28 partly open so as to clear the feather inserted by the downward stroke of the slide 23 as explained hereinafter. Figure VIII shows such position of the block 38 and the position of the clamping member 28 after the crank disc 25 has raised the clamping members approximately four fifths of their full upward movement. While the crank disc 25 dwells in this position, the cam 34 turns until it reaches the position shown in Figure V, whereupon the lower end of the lever 32 passes from the high portion of the cam onto the low portions to turn the lever 32 and arm 37 clockwise as viewed in Figure V and the block 38 is released and falls by gravity to the horizontal position illustrated in Figure V.

The ordered opening and closing of the clamp 27, 28 is related both to means for sustaining the feather in position to be taken by the clamp, and to means for bringing a shuttlecock head to position for the reception of a feather.

As shown in Figs. I and VII, a standard 39 is borne upon the table 6 and is reciprocable between ways 40. The standard affords a seat in which a feather may be set, point down, and a seat that will allow the ready removal of the feather. Conveniently, the standard carries a clip in the form of two fingers 41 and 42 that extend from its upper end and in the direction of reciprocation. One finger (41) is integrally borne by the standard; the other (42) is pivoted at its basal end to the standard, and at its distal end is advantageously provided with a vertically extending notch 43, adequate to accommodate with snug though not tight fit the shaft of a feather. The pivoted finger is, by a light spring 44, held closed upon the rigid finger. In the orifice formed by the notch 43 in the finger 42 and the opposed plane face of finger 41 the feathers one by one are manually set, vertically from above. Figs. I and VII show the parts in position for inserting a feather. This is done, and in Fig. VII the shaft 3 of a feather is indicated in place between the fingers. Fig. I clearly shows the feather in place, engaged at its tip, while throughout the greater part of its extent it stands free above the holding fingers.

A feather is so placed, and thereafter, in the ordered operation of the machine, the standard 39 advances in right-to-left traverse, as indicated in Fig. VII by an arrow, and in so doing brings the feather that it bears into position between the clamping members 27, 28, which at that moment stand open and apart. Closing of the clamp 27, 28 follows. Already it has been explained that after the closing of the clamping members the slide that carries them rises, and in this rise of the slide 23, the feather, now clamped between members 27, 28, is raised from its seat between fingers 41, 42. Thereupon, the standard 39 recedes, leaving the way clear for the descent of the slide and its burden.

Reciprocation is given to standard 39 by the oscillation of a shaft 45 (Fig. XVII). The shaft 45 bears integrally two arms 46 and 47 (cf. Fig. I). A spring 48, acting upon arm 47, maintains the arm 46 in bearing abutment upon a cam disk 49 borne by shaft 20. As the cam disk turns the standard 39 reciprocates; and by organization of the instrumentalities described the reciprocation of the standard is synchronized with the reciprocation of slide 23 and the opening and closing of the clamp 27, 28.

The spindle 4 to the left (Fig. I) is so organized that when a chuck 7 bearing a shuttlecock head 1 after placement upon the spindle 4 to the right and after the formation in the head of a circular succession of drill-holes, is removed from the spindle to the right and mounted upon the spindle to the left, one of the drill-holes of the succession will be positioned precisely and exactly beneath a feather when held in position by the clamping members 27, 28; the turning of the shaft 10 is an intermittent, step-by-step turning, and the range of turning at each step is precisely that required to shift the head, whether borne by the spindle to the right (that a succession of holes may be drilled in it) or by the spindle to the left (that a succession of feathers may be set in the previously drilled holes) through the angular interval between successive feather-receiving holes in the head. And in the intervals of rest, between the successive steps of turning of shaft 10, the instrumentalities already described act, to set the feathers in the head. In sequence upon the advance of the chuck-borne head to a position in which an unfilled hole is in alignment with a feather held in the clamp 27, 28, the turning of the crank-disk 25 carries slide 23 downward, and drives the clamped feather point first into the hole, thus planting the feather in the head. It will be understood that the attendant who initially places the feathers one by one between the fingers 41, 42 orients them to substantially correct position, and that the clamping members 27, 28 have faces so shaped as to bring the feather precisely to properly oriented position, so that the web of the planted feather extends in precisely the desired planar position relatively to the cylindrical head of the shuttlecock.

When a feather has been planted, the head bearing the planted feather turns through a small angle, sufficient to bring the next succeeding hole of the series to position to receive the next feather; but, before the feather-planting slide 23 descends again, other instrumentalities operate, to carry forward the gradual stitching together of the feathers assembled in the head. Referring to Fig. XXII, three rows 300 of stitching (the number of rows is not essential; the number three, here shown, is exemplary) are shown, encircling the shafts 3 of the assembled feathers. Each row consists of two strands of thread that pass, one on each side of each feather, and that are twisted together in the intervals between the shafts of succeeding feathers.

Referring to Fig. VIII, three identical twisters 50 are shown in vertical stand adjacent the spindle 4 (the spindle to the left, Fig. I) and on the side that affords immediate access to the vertically standing feather, newly set by the latest descent of slide 23. The relative positions in plan are sufficiently indicated in Fig. XI. (Figs. XI—XIV are views in horizontal section. In these views the head of the shuttlecock is, for simplicity, shown in plan, as though its upper surface lay in horizontal plane. That surface extends in a plane that is inclined to the horizontal, as is indicated in Fig. VIII. In this particular Figs. XI—XIV will be understood to be diagrammatic, and the showing will not be misleading). The three twisters are rotatably mounted in a bearing block 51 (Fig. XI); they are severally equipped with gear-wheels 52; the gear-wheels are of equal size and in the assembly are intermeshed, and the whole assembly is driven through a gear-wheel 53 which, borne by a shaft 54, meshes with the lowermost of the gear wheels 52. Each twister carries a pair of needles 55 that extend from the end adjacent the work (the left-hand end, Figs. VIII, XI), and the needles of each pair are spaced apart and on opposite sides of the twister and remote from the axis of twister rotation. The two needles of each pair are unequal in length (as best seen in Figs. XII—XIV), and each near its free end is provided with an eye. The twister is axially perforate, as appears in Fig. XI.

The shaft 54 is further equipped with a pinion 56, and pinion 56 is on opposite sides engaged by two racks 57 that extend vertically in parallelism and are reciprocable vertically in passageways provided for them in the body of the bearing block 51. As one or the other of the two racks 57 is impelled powerfully upward the twisters are rotated, each in one direction or the other, while the inactive rack moves idly downward.

The bearing block 51 also reciprocates in a slideway 58 upon the bed-plate 6 in right-and-left traverse, as seen in Fig. VIII—that is to say, toward and away from the work.

On the side of the spindle 4 (the spindle to the left, Fig. I) opposite the stand of twisters 50 a yielding anchorage 99 for thread is provided. From a suitable source of supply pairs of strands of thread 301 are carried from right to left (Fig. XI) through the axial bores of the twisters, and the threads are severally passed through the eyes of the needles 55. The pairs of threads pass thence over the face of the seated shuttlecock head 1, and are secured to the anchorage 99. The threads then are drawn taut.

A twister in successive positions of operation is illustrated in Figs. XI—XIV; and, since all are alike in structure and in operation, the showing of one serves for all. Beginning with Fig. XI, the bearing block 51 will be understood to stand in advanced position, the position of nearest approach to the work. The organization is such that, when the bearing block is in this advanced position, the two needles borne by each twister 50 lie in horizontal plane, the longer extending diametrically above the seated shuttlecock head, and the shorter extending tangentially with respect to the shuttlecock head, or approximately so, and overlying the head near the rim. As shown in the drawings, particularly Figure XI, the length of the longer needle is such that its end projects approximately to the center of the head 1 when the block 51 is in advanced position. The length of the shorter needle is such that it clears the last feather previously planted, when the block 51 is in advanced position. (The three pairs of needles will be understood to be disposed in three planes at different heights above the seated head.) In vertical line between the needles of the three pairs a drilled hole 100 lies exposed. In this so exposed hole a feather 3 is, by the action of slide 23, planted. The bearing block 51 then recedes (left to right, Figs. VIII, XI) and the parts assume the relative positions shown in Fig. XII. One of the racks 57 then is driven upward, setting the twisters in rotation, and forming a twist in each of the pair of threads 301, as seen in Fig. XIII. The shaft 10 then turns and carries the shuttlecock head 1 through one step of turning and brings a new drill-hole 101 to position to receive a feather. The bearing block 51 then advances again to the position shown in Fig. XI. Thus the cycle of twister operation is repeated, with a single qualification: the successive turnings of the twisters are effected alternately by one and the other of the two racks 57. In consequence, the successive twistings are in opposite directions, and the cumulative effect at the thread-supply end of the twisters, that unidirectional turning would bring about, is avoided. When the last feather has been planted and the twister withdrawn to the Fig. XII position, the pairs of threads are removed from the anchorage 99 and cut free from the twisters, and the ends are tied together, pair by pair.

The bearing block 51 is normally held by a spring 98 at the remote end of its range of reciprocation upon the bed-plate 6. Such is the position shown in Figs. IX, XII—XIV. From remote position it is intermittently advanced to the position shown in Figs. VIII and XI. This is effected by the rotation of shaft 20, and the intermediation of the cam disk 59 and the lever 60. The racks 57 are impelled upwardly and in alternation by the rotation of the shaft shaft 20, through the intermediation of the cam disks 61 and 62 and the levers 63 and 64. Consideration of Figs. VIII, XV, and XVI will show that, while cam 62 having engaged lever 64 has driven one of the racks 57 upward, the release of the lever 63 from engagement by the corresponding cam 61 has allowed the companion rack 57 to descend idly, in response to the rotation of pinion 56 with which the two racks are constantly meshed.

Referring particularly to Figs. XVII—XXI, a motor 65, through a gear-reduction 66, shaft 67, and sprocket drive 68, drives constantly the wheel 69, which is idly mounted upon shaft 24. The sprocket-chain-driven wheel 69 is the common member of two friction clutches. The driven member 70 of one of these clutches is integrally mounted upon shaft 24, so that through this friction clutch the shaft 24 is rotated; and the driven member 71 of the other of these friction clutches, through appropriate gear transmission 72, drives shaft 20. A spring 73 of adjustable tension gives efficacy to the friction clutches.

Rotation of shaft 20 imparts step-by-step turning of shaft 10 through the narrow angular range at which the holes are drilled in circular succession in the shuttlecock head. The means for accomplishing this are found in the dogs 74 (in this instance two in number, cf. Fig. VIII) borne by shaft 20, which as shaft 20 turns makes successive periodic engagement with the ratchet disk 75 borne rigidly by shaft 10.

To the end that the several operations of the machine shall be effected in proper coordination, a system of latches is arranged to release the shafts 20 and 24 to the torque of the rotating clutch member 69 in ordered sequence. A latch 78, engaging a tooth 70*a* upon the periphery of the clutch-disk 70, is effective to hold shaft 24 from turning; and two latches are alternately effective to hold shaft 20 from turning—one latch, 76, engaging the teeth 77*a* and 77*b* upon a disk 77 on shaft 20, and the other latch, 79, engaging the teeth 80*a* upon disk 80 integrally borne by shaft 20. A solenoid 85 when energized swings latch 76 to release position. A sleeve 81, with toothed periphery, integrally borne by shaft 20, is effective as shaft 20 turns, to engage a lever 82 and shift latch 78 into release position; a sleeve 83, with toothed periphery, integrally borne by shaft 24, is effective as shaft 24 turns to engage a lever 84 and shift latch 79 into release position. In service the motor 65 drives the disk 69 continuously, and the several latches are in ordered sequence actuated to release the shafts 20 and 24 to the driving torque of the member 69, and then to arrest them again.

It will be understood that the latches 76 and 78 extend in the shaft-arresting positions shown in Fig. XVIII until it is desired to begin a shuttlecock-assembling operation. To start the operation a pedal switch (not shown) is pressed and the solenoid 85 is energized. Thereupon the latch 76 swings counter-clockwise, disengaging the tooth 77*a* and releasing the disk 77. The shaft 20 is released to the torque of member 69 and begins to turn. At the instant the rotation of the shaft 20 is thus initiated, the twister block 51 is in the position shown in Fig. IX.

Immediately after the shaft 20 begins to rotate the cam 62 permits the arm 64 to fall and shortly thereafter the cam 61 raises the arm 63 and its rack 57 whereby the three sets of needles are rotated, forming a twist in each of the three pairs of threads extending from the stem of the feather that preparatory to the operation has been planted in the shuttlecock head. (Compare the positions of the threads Figs. XII and XIII.) Next, in the successive operations of the machine, one of the dogs 74 on the rotating shaft 20 engages the ratchet-wheel 75, turning the shuttlecock head, and bringing a drill-hole into position of vertical alignment with the clamp 27, 28 (cf. the hole 101 in Fig. XIV). Then the cam 59, turning with the shaft 20, swings the lever 60 and advances the twister block to the position in which the paired threads are spread (Fig. XI) to allow the stem of the feather that is next to be planted in the head to descend between them.

While these operations are in progress, the following movements are effected in ordered succession: The lever 32, 37 swings clockwise, and under the stress of spring 31 the clamp 27, 28 opens fully for the reception of a feather (Fig. V); then the slide 39 shifts in right-to-left direction (Fig. I), carrying a feather that has been manually inserted between the fingers 41, 42, into position between the opened clamp members. Then the lever 32, 37 swings counterclockwise, closing the clamp upon the feather. As this stage in the operation is reached, the tooth 81*a* on the turning sleeve 81 (Fig. XVIII) engages and swings lever 82, lifting the latch 78 (Fig. XIX) and releasing shaft 24 to the torque of friction clutch 69, 70; thereupon the shaft 24 is set in rotation, and the crank-disk 25 on such shaft, acting through link 26, raises the slide 23, and lifts the clamped feather from the fingers 41, 42; then, through the operation of instrumentalities above described, the fingers recede; and the slide 23, passing its upper limit, moves downward, planting the feather in the shuttlecock head. As the clamp approaches its lower limit of travel, the arm of clamp member 28 passes below the arm of the T-shaped block 38, and the clamp opens (cf. broken-line position in Fig. VI), while the tooth 80*a* on disk 80 comes to abutment upon the latch 79 (Fig. XX), bringing the shaft 20 to rest, with the effect that the bearing block 51 and the twisters are arrested in retracted position (Figs. IX and XIV). The rotation of the crank-disk 25 continues, and carries the open clamp upward and away from the planted feather, and as the disk 25 approaches the end of a complete rotation, and the rising clamp moves upward from the path of the twister needles, the tooth 83*a* on the sleeve 83 engages and swings the lever 84, thereby raising the latch 79 and once again releasing the shaft 20 to rotative stress. The shaft 20 turns through a small angular range, and is arrested by the abutment upon latch 76 of tooth 77*b* of the disk 77. The rotating shaft 24 is simultaneously arrested (with the clamp-bearing slide 23 returned to initial position), by the abutment upon latch 78 of tooth 70*a* of the disk 70. In such rotation of the shaft 20 through the small angular range, the bearing block 51 recedes from the shuttlecock head, to the position shown in Figs. IX and XII, and the threads are drawn taut against the stem of the planted feather, and in such position they are ready to be twisted. Such is the cycle of the feather-assembling operations, in which the shaft 20 has turned through 180° and the shaft 24 through 360°.

From what has been said earlier, it will be understood that in the rotation of the shaft 20 through 180° the drill 18 is through the instrumentalities of the cam 19 and the spring 21 moved downward through a hole-forming stroke and raised again.

In repeating the cycle of operations described, as the cycle must be repeated for each feather that goes into the vane of the shuttlecock, the solenoid 85 is again energized. Again the latch 76 is released; the shaft 20 rotates; the needles 55 twist the paired threads 301 (Fig. XIII); the bearing block 51 advances to the position shown in Fig. XI; the feather is introduced to the clamp; and so on.

While the operation of the machine is arrested at the end of each cycle, as described, it will be understood that, alternatively, the solenoid may be continuously energized (the pedal switch may be held in circuit-closing position), and the cycles repeated without intermission; that is, after the first feather has been planted, and the otherwise free ends of threads 301 have been fastened to the member 99, the operation may be continuous.

It is noteworthy that the machine is readily adapted to the assembly of vanes having a greater or less number of feathers than here illustrated. It is simply necessary to apply to the shaft 10 a ratchet-wheel 75 whose teeth correspond in number to the feathers in the vane to be assembled. All of the several operations of the machine—the drilling of the holes in the shuttlecock head, and the planting and stitching of the feathers—are without other provision or adjustment properly coordinated.

Recurring finally to the fluid pressure cylinder 13 by which the block 11 is reciprocated, it is manifest that a control valve may be provided which, subject to the rotation of shaft 10, will effect the recession of the block 11 when a shuttlecock head borne by the spindle to the right (Fig. I) has received its complement of drilled holes. Such elaboration, however, is hardly necessary, since an attendant can readily at proper time shift such control valve to cause the block 11 at proper time to recede and allow the removal of a completely drilled head, and to advance again when a fresh and undrilled head has been set in place.

I claim as my invention:

1. In a machine for building shuttlecocks two spindles rotatably mounted in suitable support, means for effecting simultaneous turning of the two spindles through equal angular ranges, each spindle being adapted to receive and carry a shuttlecock head, means for sinking a hole in a shuttlecock head carried by one of said spindles, and means for planting a feather in a hole sunk in a shuttlecock head carried by the other of said spindles.

2. The structure of claim 1, the hole-sinking means including a drill reciprocable in synchronism with spindle rotation, and the feather-planting means including a clamp reciprocable in synchronism with spindle rotation.

3. In a machine for building shuttlecocks two spindles rotatably mounted in suitable support means for effecting simultaneous turning of the two spindles through equal angular ranges, a chuck adapted to receive a shuttlecock head and applicable to either of the two spindles with the axis of the shuttlecock head aligned with the axis of spindle rotation and in predetermined positions within the range of turning of the seated shuttlecock head upon such axis, means for sinking a hole in a shuttlecock head when applied to one of said spindles, and means for planting a feather in a hole sunk in a shuttlecock head when applied to the other of said spindles.

4. In a shuttlecock-building machine, and in combination with a seat for a shuttlecock head, a feather-planter including ways, a slide reciprocable in said ways, a clamp borne by said slide, yielding means for maintaining the clamp in normally open position, a clamp-closing lever, a T-shaped block pivoted by one arm to said lever and limited in pivotal movement in one direction by abutment of the stem of the T upon the lever, the clamp throughout a portion of its range reciprocation being engaged by the free arm of the T-shaped block and in further traverse passing beyond such engagement and abutting upon the stem of the T-shaped block and the clamp in its return reciprocation engaging from beneath the free arm of the T-shaped block, and means for effecting coordinated reciprocation of said slide and swing of said lever.

5. In a shuttlecock-building machine the combination of a support, a spindle rotatably mounted in the support, means for imparting to the spindle intermittent, step-by-step turning, reciprocable feather-planting means arranged adjacent to said spindle, a reciprocable and rotatable twister arranged adjacent to said spindle, and means for effecting operation of the said parts in ordered sequence, as follows: (1) turning of the spindle, (2) forward reciprocation of the twister, (3) downward and upward reciprocation of the feather-planting means, (4) rearward reciprocation of the twister; and (5) rotation of the twister.

6. In shuttlecock-building machinery and in combination with a rotatable seat for a shuttlecock head, a twister for applying a stitching of thread to the shafts of a succession of feathers set in a seated head, such twister including a support, an axially perforate rotatable cylindrical body axially reciprocable in said support, said body being provided with a plurality of eyed needles projecting longitudinally from one end of the body and spaced apart relatively to the axis of rotation.

7. In a shuttlecock-building machine the combination of a support, two spindles rotatably borne by said support, means for imparting to the spindles simultaneous and intermittent turning through successive predetermined and equal ranges, a seat for the head of a shuttlecock applicable to and removable from either of the two spindles in predetermined position with respect to the range of turning, means reciprocable above one of said spindles for sinking a hole in a seated shuttlecock head, means reciprocable above the other of said spindles for planting a feather in a hole sunk in a seated shuttlecock, the last-named means including a clamp and means for opening and closing the clamp in ordered sequence in the course of the reciprocation thereof, a feather carried reciprocable to and from position of cooperation with said feather-planting means, and a rotatable thread-twister reciprocable in a plane above the face of a shuttlecock head seated in the second of said spindles, means for effecting reciprocation of the hole-sinking means during the period of rest of the spindles, and means for effecting movement of the parts associated with the second of the two spindles during the period of rest of the spindles in ordered sequence, as follows: (1) advance of the feather carrier and of the thread twister, (2) closure of the clamp of the feather planter, (3) rise of the feather planter, (4) recession of the feather carrier, (5) descent of the feather planter, (6) recession of the twister, (7) rotation of the twister, and (8) subsequent to (5) the rise of the feather-planter.

8. In a shuttlecock-making machine, the combination of an intermittently rotated chuck for holding the head of a shuttlecock, a vertically reciprocating gripper to insert a feather in the head while the head is at rest and to release the feather thereafter, and a sewing mechanism, said mechanism having means for forming an open loop over the head through which the feather shaft is inserted by the gripper and means for contracting the loop about the feather shaft and twisting the threads.

9. In a shuttlecock-making machine, the combination of an intermittently rotated chuck for holding the head of a shuttlecock, a sewing mechanism comprising a reciprocating needle carrier, two spaced needles on the carrier adapted to be moved by the carrier over the head, each needle being adapted to carry a thread, reciprocating means to plant a feather in the head between the needles when the needles are over the head, and means operative when the needles are withdrawn from the head to rotate the needle carrier and twist the threads together between successive feathers.

10. A machine for making shuttlecocks comprising the combination of a mechanism for planting a plurality of feathers in the head of the shuttlecock and a plurality of sewing mechanisms and operating concurrently therewith for applying a plurality of circumferential bands of twisted threads simultaneously about the shafts of the feathers.

11. A machine for making shuttlecocks comprising the combination of a mechanism for planting a plurality of feathers successively in the head of the shuttlecock and a plurality of sewing mechanisms operating concurrently therewith for applying a plurality of circumferential bands of twisted threads simultaneously about the shafts of the feathers as they are successively planted in the head.

12. In a shuttlecock-making machine an intermittently rotated holder for the head of the shuttlecock, means for planting a feather in the head at each period of rest of the head, a needle carrier movable toward and from the head while it is at rest, spaced needles in the carrier each adapted to hold a thread, said needles forming a loop through which the shaft of the feather is inserted when planted in the head, means operative thereafter to withdraw and rotate the needle carrier and thereby twist the threads together at the side of the feather, and means to advance the holder after each twisting operation.

13. A machine as set forth in claim 12 in which the needle carrier is rotated in reverse directions for successive cycles of the operation.

14. In a shuttlecock-making machine, an intermittently rotated holder for the head of the shuttlecock, means for planting a feather in the head at each period of rest of the head, a needle carrier movable toward and from the head while it is at rest, a plurality of aligned sets of spaced needles in the carrier, each set of needles adapted to hold two threads and to form a loop of the threads, the shaft of the feather passing through all of the loops when the feather is planted in the head, means operative thereafter to withdraw the carrier and rotate the sets of needles and thereby twist the several sets of threads together at the side of the feather, and means to advance the holder after each twisting operation.

15. In a shuttlecock-making machine, means for receiving and supporting the head of a shuttlecock, means for successively planting the shafts of feathers in circumferentially spaced relation around said head, means for looping a pair of threads in opposite directions around the shafts of adjacent feathers, and driving means operating said planting means and said looping means alternately in a predetermined time relation.

16. In a shuttlecock-making machine, means for receiving and supporting the head of a shuttlecock, means for successively planting the shafts of feathers in circumferentially spaced relation around said head, means for simultaneously looping a plurality of pairs of threads about the shafts of adjacent feathers in spaced relation along the shafts with the threads of each pair extending in opposite directions around each feather shaft, and driving means operating said planting means and said looping means alternately in a predetermined time relation.

17. In a shuttlecock-making machine, means for supporting and intermittently rotating the head of a shuttlecock, means for planting a feather in the head at each pause of the head supporting means, and a device for twisting threads about the shafts of the feathers as they are successively planted in the head, said device comprising a needle carrier, a pair of needles in the carrier each adapted to hold a thread, means to move the carrier toward and from the head, one of said needles being relatively long so as to pass over a portion of the head when the carrier is advanced toward the head, the other needle being relatively short so as to clear a feather which has been planted in the head, and means to rotate the needle carrier after a feather has been planted in the head and after the carrier has been withdrawn.

18. In a shuttlecock-making and sewing machine, a holder for the head of a shuttlecock, a pair of needles each adapted to carry a thread, means to plant a series of feathers in a circle in the head, means to reciprocate the needles toward and from the holder, the end of one of said needles in its advanced position toward the head being within the circle formed by the feathers and the end of the other needle lying outside of the said circle and means to manipulate the needles to interlock the threads after each feather planting operation and after the needles have been withdrawn from the head.

19. In a shuttlecock-making machine, means for receiving and supporting the head of a shuttlecock, means for successively planting the shafts of feathers in circumferentially spaced relation around said head including a reciprocating slide having a feather clamp pivoted thereon and means for holding the clamp closed during the feather-planting operation including means for releasing the clamp after the lapse of a predetermined time following the feather-planting operation and means operated by movement of the slide for releasing the clamp immediately on the completion of a feather-planting operation.

20. In a shuttlecock-making machine, means for receiving and supporting the head of a shuttlecock, means for successively planting the shafts of feathers in circumferentially spaced relation around said head including a reciprocating slide having a feather clamp pivoted thereon, means for operating the clamp to grip a feather during the feather-planting operation including a cam and a cam follower, the cam having a high portion which passes the follower only after a predetermined time following the completion of a feather-planting operation. and means actuated by the follower for holding the clamp in gripping position, said means having sliding bearing on the clamp, and a shoulder on said clamp positioned to trip said detent on completion of a feather-planting operation.

21. In a shuttlecock-making machine, means for receiving and supporting the head of a shuttlecock, means for successively planting the shafts of feathers in circumferentially spaced relation around said head including a reciprocating slide having a feather clamp pivoted thereon, a cam, an arm actuated by said cam, a tilting detent on said arm engaging said clamp, a shoulder on the clamp positioned to trip the detent on the completion of a feather-planting operation to open said clamp partly, said cam thereafter permitting the arm to tilt whereby said detent returns to its initial operative position.

22. In a shuttlecock making machine, the combination of an intermittently rotating chuck for holding the head of the shuttlecock, means for inserting a feather in the head while it is at rest, and a sewing mechanism, said mechanism having means for forming an open loop over the head through which the feather shaft is inserted and for contracting the loop about the feather shaft and twisting the threads.

23. In a shuttlecock making machine, the combination of an intermittently rotating chuck for holding the head of a shuttlecock, means for inserting a succession of feathers in the head, and a plurality of sewing mechanisms operating to form loops about the feathers as they are successively inserted so as to provide a plurality of circumferential bands of thread connecting the feathers.

24. In a shuttlecock making machine, means for receiving and supporting the head of a shuttlecock, means for successively planting the shafts of feathers in circumferentially spaced relation around said head, sewing means for looping a pair of threads around the shaft of each feather as it is planted, and driving means operating said planting means and said sewing means alternately in a predetermined time relation.

25. In a shuttlecock making machine, means for receiving and supporting the head of the shuttlecock, means for successively planting the shafts of feathers in circumferentially spaced relation around said head, sewing means for simultaneously looping a plurality of pairs of threads around the shaft of each feather as it is planted, and driving means operating said planting means and said sewing means alternately in a predetermined time relation.

26. In a shuttlecock making machine, means for receiving and supporting the head of a shuttlecock, sewing means for forming a loop in one of a pair of threads adjacent said head, means for planting the shaft of a feather in said head with the shaft extending through said loop, said sewing means acting to thereafter twist the threads around said feather shaft, and driving means operating the feather planting means and the sewing means in a predetermined time relation.

27. In a shuttlecock making machine, means for receiving and supporting the head of a shuttlecock, means for forming a loop in one of a pair of threads adjacent said head, means for planting the shaft of a feather in said head with the shaft extending through said loop, means whereby said loop-forming means twists the threads together around said shaft, said loop-forming means including a holder, a pair of spaced needles extending side-by-side from said holder, means mounting said holder for rotation about an axis intermediate the needles and means for shifting said mounting means along said axis toward and from said head-receiving means and rotating said holder in a predetermined time relation to the operation of said feather-planting means.

28. In a shuttlecock making machine, means for receiving and supporting the head of a shuttlecock, means for forming a loop in one of a pair of threads adjacent said head, means for planting the shaft of a feather in said head with the shaft extending through said loop, means whereby said loop-forming means twists the threads together around said shaft, said loop-forming means including a holder, a pair of spaced needles of different lengths extending side-by-side from said holder, means mounting said holder for rotation about an axis intermediate the needles and means for shifting said mounting means along said axis toward and from said head-receiving means and rotating said holder in a predetermined time relation to the operation of said feather-planting means, whereby the longer needle advances beyond the shaft of the last feather planted and the other needle stops short of it.

29. In a shuttlecock making machine, means for receiving and supporting the head of a shuttlecock, means for successively planting the shafts of feathers in circumferentially spaced relation around said head including a reciprocating slide having a feather clamp pivoted thereon, and clamp-operating means including a crank arm, a detent thereon adapted to engage the clamp and hold it closed as it descends until the clamp passes off of the detent at a predetermined point in the travel of said slide, thereby releasing a feather gripped by the clamp, and means for adjusting the crank arm.

30. In a shuttlecock making machine, means for receiving and supporting the head of a shuttlecock, means for successively planting the shafts of feathers in circumferentially spaced relation around said head including a reciprocating slide having a feather clamp pivoted thereon, and clamp-operating means including a crank arm, and a detent thereon adapted to engage the clamp and hold it closed as it descends until the clamp passes off of the detent at a predetermined point in the travel of said slide, thereby releasing a feather gripped by the clamp.

31. In a shuttlecock making machine, the combination with a chuck for receiving the head of a shuttlecock, means for rotating the chuck in steps, and means for inserting a feather in the head between successive steps, of a spindle movable toward and from said chuck having spaced needles projecting from an end thereof, and means for actuating said spindle in timed relation to the movements of the chuck, to form a loop of threads through which each feather may be inserted and then tighten the loop.

32. In a shuttlecock making machine the combination of a mechanism for planting feathers successively around the rim of a shuttlecock head, a sewing mechanism for looping thread around each feather as it is planted so as to provide a circumferential band of thread connecting the feathers, and driving means for operating said feather planting mechanism and sewing mechanism in a predetermined timed relation.

33. In a machine for making shuttlecocks, the combination of an intermittently rotating chuck for holding the head of a shuttlecock, mechanism for planting feathers successively around the rim of the shuttlecock head, a sewing mechanism for looping thread around each feather as it is planted so as to provide a circumferential band of thread connecting the feathers, and driving means for operating the intermittently rotating chuck, the feather planting mechanism and the sewing mechanism in a predetermined timed relation.

WALTER E. HUMPHREY.